United States Patent
Yoon et al.

(10) Patent No.: US 12,352,326 B2
(45) Date of Patent: Jul. 8, 2025

(54) BRAKE PAD, BRAKE CALIPER EQUIPPED WITH THE BRAKE PAD, AND VEHICLE EQUIPPED WITH THE BRAKE CALIPER

(71) Applicant: HYUNDAI MOBIS CO., LTD., Seoul (KR)

(72) Inventors: Bo Ram Yoon, Yongin-si (KR); Mun Hwan Byoun, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 359 days.

(21) Appl. No.: 17/950,641

(22) Filed: Sep. 22, 2022

(65) Prior Publication Data

US 2023/0175563 A1   Jun. 8, 2023

(30) Foreign Application Priority Data

Dec. 2, 2021   (KR) .................. 10-2021-0170945
Dec. 31, 2021  (KR) .................. 10-2021-0193746

(51) Int. Cl.
*F16D 65/097*   (2006.01)
*F16D 65/00*    (2006.01)

(52) U.S. Cl.
CPC ..... *F16D 65/0972* (2013.01); *F16D 65/0068* (2013.01); *F16D 65/0973* (2013.01)

(58) Field of Classification Search
CPC ............ F16D 65/0972; F16D 65/0068; F16D 65/0973
USPC ........................................... 188/73.36–73.38
See application file for complete search history.

(56) References Cited

U.S. PATENT DOCUMENTS

| | | | | |
|---|---|---|---|---|
| 4,469,205 A * | 9/1984 | Stoka | ................. | F16D 65/0978 188/73.38 |
| 7,318,503 B2 * | 1/2008 | Farooq | ................ | F16D 65/0974 188/73.31 |
| 9,506,514 B1 * | 11/2016 | Tekesky | ................ | F16D 55/226 |
| 10,774,889 B2 * | 9/2020 | Baek | ................... | F16D 65/0972 |

FOREIGN PATENT DOCUMENTS

KR   10-2019-0069884 A   6/2019

* cited by examiner

*Primary Examiner* — Christopher P Schwartz
(74) *Attorney, Agent, or Firm* — NovoTechIP International PLLC

(57) ABSTRACT

The present disclosure relates to a brake pad, a brake caliper equipped with the brake pad, and a vehicle equipped with the brake caliper. The brake pad may include two brake pad connectors symmetrically positioned with respect to a center of a brake pad surface and connected to the caliper body by springs. Reliability of a return operation of the brake pad is secured, thereby reducing drag and braking noise.

16 Claims, 28 Drawing Sheets

A - A section

C - C section

C - C section

A - A section

A - A section

D - D section (a)

(b)

C - C section

B - B section

BRAKE PAD, BRAKE CALIPER EQUIPPED WITH THE BRAKE PAD, AND VEHICLE EQUIPPED WITH THE BRAKE CALIPER

CROSS-REFERENCE TO RELATED APPLICATIONS

Pursuant to 35 U.S.C. § 119(a), this application claims the benefit of priority to Korean Patent Application Nos. 10-2021-0170945 and 10-2021-0193746 filed on Dec. 2, 2021 and Dec. 31, 2021, respectively, of which the disclosure is incorporated herein by reference in their entirety.

TECHNICAL FIELD

The present embodiments relate to a brake pad, a brake caliper, and a vehicle equipped with the brake caliper, which are applicable to vehicles in all fields, and more particularly, to a brake pad, a brake caliper, and a vehicle equipped with the brake caliper related to a return structure of the brake pad.

BACKGROUND

A brake caliper mounted in a vehicle is a device for decelerating or stopping the traveling vehicle or maintaining the stopped state of the vehicle, and is a device that obtains a braking force by strongly pressing, with brake pads from both sides, a circular disk rotating together with a vehicle wheel.

In a conventional brake caliper, two brake pads disposed on both sides of a disk in a caliper body (a housing) are supported in a state capable of advancing and retreating. A pad support pin for guiding the advance and the retreat of the brake pads and a spring member for elastically supporting an upper portion of each of two pad plates so as to prevent vibration of the pad plate and ensure a smooth return operation are installed on top of each of the two brake pads.

However, in such a conventional brake caliper structure, an elastic force is intensively applied to the upper portion of the brake pad. Thus, even when the return operation is smooth at the upper portion of the brake pad because of elasticity, there is a probability that the force is not transmitted well to a lower portion of the brake pad and a brake pad surface returns non-parallel to a disk surface.

As a result, the return operation of the brake pad is incomplete due to such a problem, and drag characteristics and braking noise are caused, so that there is a need for improvement. A background technology for an embodiment disclosed in the present specification is disclosed in Korean Patent Application Publication No. 10-2019-0069884 (published on Jun. 20, 2019, title of the invention: caliper apparatus).

SUMMARY

Embodiments of the present disclosure are to provide a brake pad, a brake caliper, and a vehicle equipped with the brake caliper capable of providing a uniform return force to the brake pad.

In addition, embodiments of the present disclosure are to provide a brake pad, a brake caliper, and a vehicle equipped with the brake caliper capable of simplifying a structure of the brake caliper and increasing space efficiency.

The problems to be solved in the present disclosure are not limited to the technical problems mentioned above, and other technical problems that are not mentioned may be clearly understood by those with ordinary knowledge in the technical field to which the present disclosure belongs from the description below.

A brake pad according to one of the embodiments of the present disclosure includes at least two brake pad connectors connected to a caliper body, and the at least two brake pad connectors are symmetrically positioned with respect to a center of a brake pad surface.

Preferably, each brake pad connector includes a protruding ear protruding from the brake pad in an outward direction of the pad surface, and a spring connected to the protruding ear.

In addition, preferably, each protruding ear includes an ear groove at which a portion of the spring is seated, and a fixing portion for fixing the spring to the protruding ear.

In addition, preferably, each spring includes a propping plate seated at the ear groove and connected to the fixing portion, a first extending member connected to the propping plate with a predetermined angle, and a second extending member connected to the first extending member with a predetermined angle.

In addition, preferably, the fixing portion is a protrusion protruding in the ear groove, and the propping plate has a hole defined therein allowing the protrusion to extend therethrough.

In addition, preferably, an angle between the first extending member and the second extending member is in a range from about 0 degree to about 90 degrees.

In addition, preferably, the first extending member is longer than the second extending member.

In addition, preferably, the spring further includes a third extending member positioned between and connected to the propping plate and the first extending member, and an angle between the third extending member and the propping plate is equal to or greater than about 90 degrees.

A brake caliper according to one of the embodiments of the present disclosure includes the brake pad, and the caliper body having an internal space at which the brake pad is seated.

Preferably, the caliper body includes a pad guide groove for guiding each protruding ear of the brake pad when the brake pad moves, and a spring seating groove, wherein the spring seating groove is a space at which each spring of the brake pad is seated.

In addition, preferably, the spring seating groove includes a maintenance hole, and the maintenance hole is a through-hole for connecting the spring seating groove and an external space to each other.

In addition, preferably, the spring seating groove is a surface formed parallel to a pad surface of the brake pad, and the spring seating groove has, as an edge, a first surface for supporting the second extending member of the spring when the brake pad moves.

In addition, preferably, the pad guide groove and the spring seating groove are spatially connected to each other. In addition, preferably, the pad guide groove has a pad guide surface in contact with an outer surface of the protruding ear as an edge.

In addition, preferably, the spring seating groove has a depth greater than a length of the first extending member of the spring.

In addition, preferably, the maintenance hole is parallel to a longitudinal direction of the first surface, and formed in a direction capable of compressing the spring.

A vehicle equipped with the brake caliper according to one of the embodiments of the present disclosure has the brake caliper having the caliper body of a monoblock type.

Preferably, the brake caliper is connected to a wheel of the vehicle such that a direction of the maintenance hole of the caliper body is perpendicular to the ground.

In addition, a brake pad seated at the caliper body according to one of the embodiments of the present disclosure includes a brake pad connector connected to the caliper body, and at least two brake pad connectors are symmetrically positioned with respect to a center of a brake pad surface.

Preferably, each brake pad connector includes a protruding ear outwardly protruding from the brake pad, and a spring connected to the protruding ear.

In addition, the protruding ear has a fixing portion capable of connecting the spring.

In addition, preferably, the spring includes a fixing plate fastened with the fixing portion so as to be in contact with a top surface of the protruding ear, a support plate connected to one edge of the fixing plate and in contact with one side surface of the protruding ear, a propping plate connected to one edge of the support plate and in contact with a bottom surface of the protruding ear, a first extending member having one end connected to one edge of the propping plate, and a second extending member having one end connected to the other end of the first extending member with a predetermined angle.

In addition, preferably, the fixing portion is a protrusion, and the fixing plate has a fixing hole defined therein, wherein the protrusion is able to extend through the fixing hole.

In addition, preferably, the spring further includes a first slide plate connected to an edge of a side surface of the support plate and in contact with one side surface of the protruding ear, and a second slide plate connected to an edge of an opposite side surface of the support plate and in contact with an opposite side surface of the protruding ear.

In addition, preferably, the first slide plate includes at least one bent portion, and a minimum distance L1 between the first slide plate and the second slide plate is smaller than a first width D2 of the protruding ear.

In addition, preferably, a minimum distance L3 between the fixing plate and the propping plate is smaller than a second width D3 of the protruding ear.

In addition, preferably, the propping plate includes at least one bent portion.

In addition, a brake caliper equipped with the brake pad according to one of the embodiments of the present disclosure includes the brake pad, and the caliper body having an internal space at which the brake pad is seated.

In addition, preferably, the caliper body includes a pad guide groove for guiding each brake pad connector of the brake pad when the brake pad moves, and a spring seating groove, wherein the spring seating groove is a space at which each spring of the brake pad is seated.

In addition, preferably, the caliper body includes a maintenance hole connected to an external space through the caliper body from the spring seating groove.

In addition, preferably, the spring seating groove has, as an edge, a first surface parallel to the brake pad and supporting the second extending member when the spring is tensioned.

In addition, preferably, the pad guide groove and the spring seating groove are spatially connected to each other.

In addition, preferably, the pad guide groove has, as an edge, a pad guide surface in contact with an outer surface of the first slide plate or an outer surface of the second slide plate.

In addition, preferably, the spring seating groove has a depth D1 greater than a length of the first extending member of the spring.

In addition, the maintenance hole is defined in a direction capable of compressing the spring.

A vehicle equipped with the brake caliper according to one of the embodiments of the present disclosure has the brake caliper having the caliper body of a monoblock type.

Preferably, the brake caliper is connected to a wheel of the vehicle such that a direction of the maintenance hole of the caliper body is perpendicular to the ground.

According to one of embodiments of the present disclosure, the reliability of the return operation of the brake pad is secured, so that the drag phenomenon and the braking noise are reduced.

In addition, internal space efficiency of the brake caliper may be increased. For example, a component for another function may be added to a space where a guide pin or a pad liner has been located by removing the guide pin or the pad liner that has been conventionally located inside the brake caliper. In addition, manufacturability may be increased by simplifying the brake caliper structure.

In addition, detachment between the brake pad and the caliper body may be easy, and the foreign substances introduced into the inner space of the brake caliper may be smoothly discharged.

The effects that may be obtained from the present disclosure may not be limited to the effects mentioned above, and other effects not mentioned will be able to be clearly understood by those with ordinary skill in the technical field to which the present disclosure belongs from the description below.

DETAILED DESCRIPTION

Figure 1:
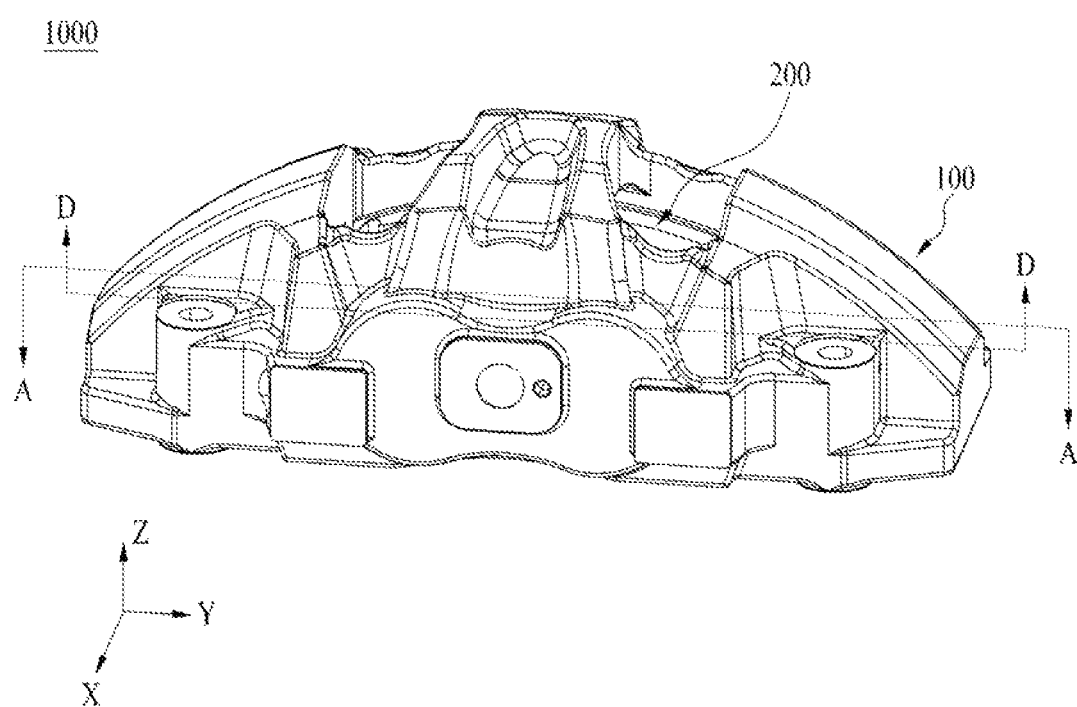
FIG. 1 is a perspective view of a brake caliper according to one of embodiments of the present disclosure.

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component. Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath" another component may be placed "above" said another component. Accordingly, the exemplary term "below" may include both downward direction and upward direction. Components may also be oriented in other directions, and thus, spatially relative terms may be interpreted based on the orientation.

Figure 2:
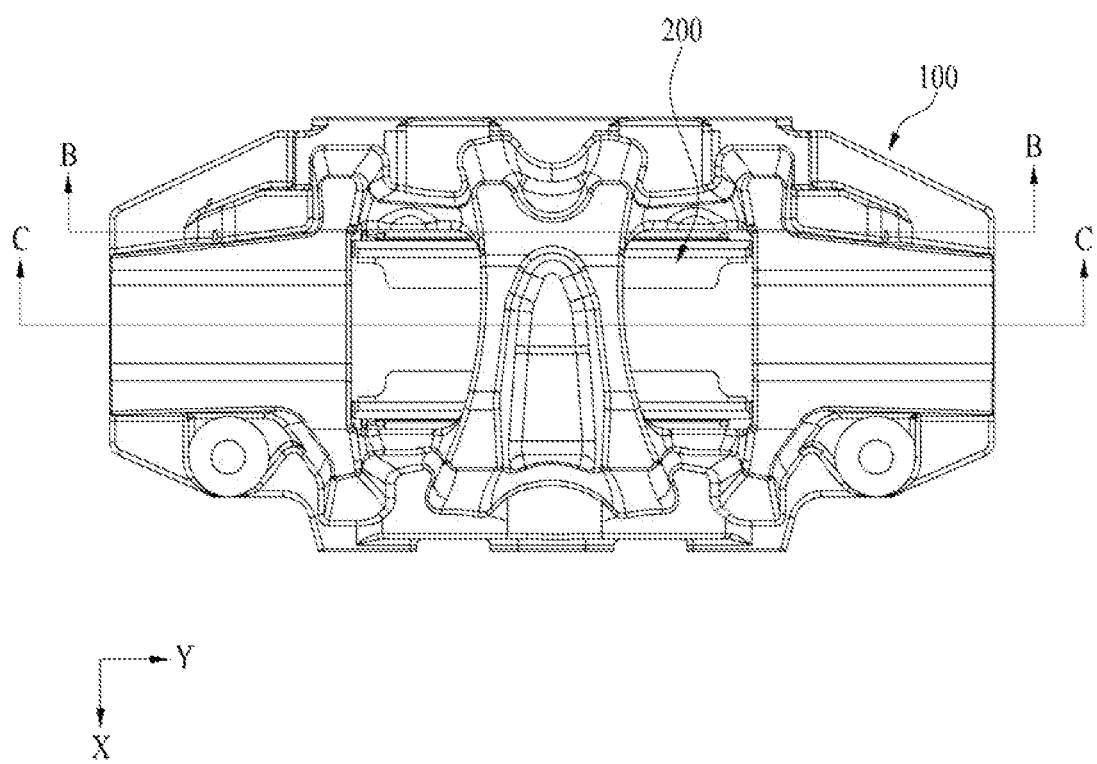
FIG. 2 is a top plan view of a brake caliper according to one of embodiments of the present disclosure.

FIG. 1 is a perspective view of a brake caliper (hereinafter, referred to as a "brake caliper") 1000 according to one of embodiments of the present disclosure. FIG. 2 is a top plan view of the brake caliper 1000, and FIG. 3 is a bottom plan view of the brake caliper 1000.

Figure 3:
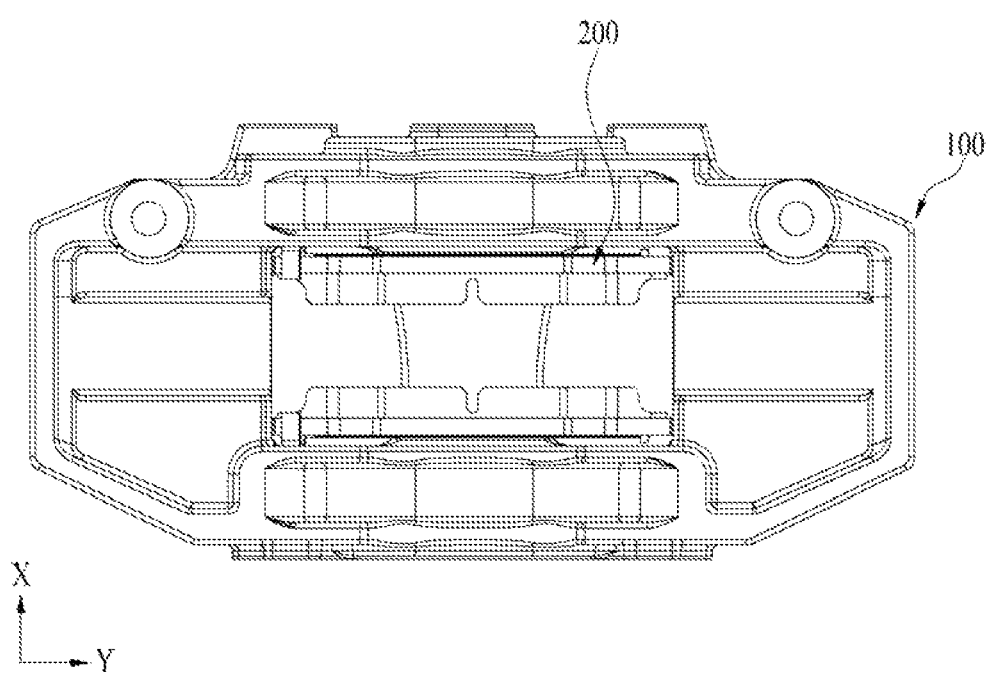
FIG. 3 is a bottom plan view of a brake caliper according to one of embodiments of the present disclosure.

As shown in FIGS. 1 to 3, the brake caliper 1000 includes a caliper body 100 having a hollow therein, and includes a brake pad 200 seated at the hollow inside of the caliper body 100. The caliper body 100 may be of a monoblock type in which all parts are integrated. In the monoblock type, an area of the brake pad 200 is able to be designed widely, and the brake pads 200 compress a brake disk from both sides, so that a braking response is excellent.

Hereinafter, in describing components of the brake caliper 1000, an up and down direction, a left and right direction, and a front and rear direction are based on directions illustrated in FIG. 1. An upper side of the brake caliper 1000 shown in FIG. 1 is an upper side, a lower side thereof is a lower side, a left side thereof is a left side, and a right side thereof is a right side. In addition, a direction in which a surface of the brake caliper 1000 shown in FIG. 1 is directed is a forward direction, and a direction in which a surface of the brake caliper 1000 not shown in FIG. 1 is directed is a rearward direction. Similarly, with respect to coordinate axes shown in FIG. 1, a z-axis direction indicates the upward direction of the brake caliper 1000, a y-axis direction indicates a rightward direction of the brake caliper 1000, and an x-axis direction indicates the forward direction of the brake caliper 1000. FIGS. 1 to 3 show the brake caliper 1000 and a coordinate system of the x-axis, the y-axis, and the z-axis.

Figure 4:
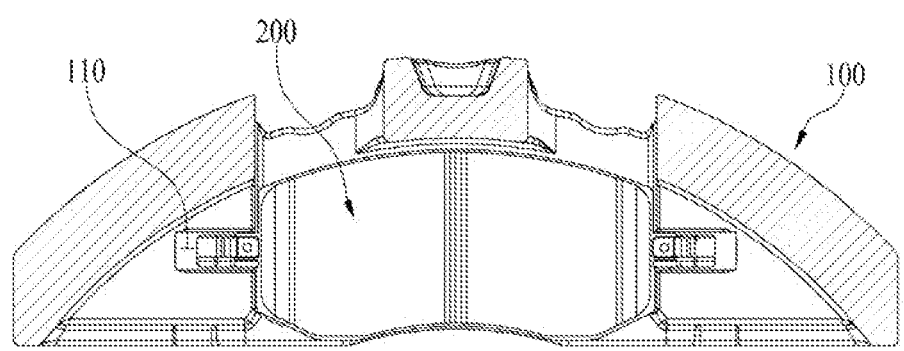
FIG. 4 is a cross-sectional view taken along a line C-C in FIG. 2.
Figure 5:
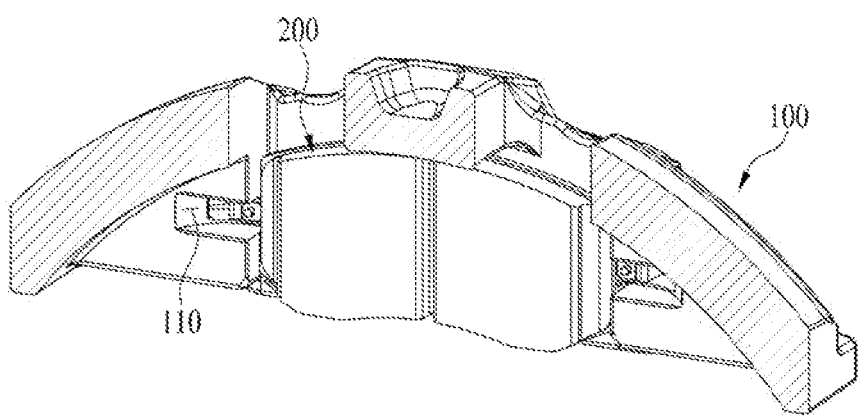
FIG. 5 is a view illustrating FIG. 4 viewed in a diagonal direction.

FIG. 4 is a cross-sectional view taken along a line C-C in FIG. 2. That is, FIG. 4 shows a cross-section of the brake caliper 1000 taken along a YZ plane from above and center. In addition, FIG. 5 is a view illustrating FIG. 4 viewed in a diagonal direction from above and right. Referring to FIGS. 4 to 5, the state in which the brake pad 200 is seated at the hollow inside of the caliper body 100 is illustrated.

The brake pad 200 in FIG. 4 may move in the front and rear direction inside the brake caliper 1000 by a piston (not shown). The brake pad 200 may come into contact with the brake disk (not shown) by moving in the forward direction by the piston (not shown), and may apply a braking force to a wheel of a vehicle. Thereafter, when returning to an original position thereof, the brake pad 200 moves in the rearward direction (a return operation). In this regard, when the return operation of the brake pad 200 is delayed or portions of a surface of the brake pad 200 have a movement deviation, drag and braking noise may be caused.

The brake pad 200 may include at least two brake pad connectors 210 symmetrically at left and right sides thereof, and the brake pad connectors 210 may be located in a central portion in the up and down direction of the brake pad 200. Accordingly, the two brake pad connectors 210 may be symmetrical with each other with respect to a center of the surface of the brake pad 200. That is, the positions at which the brake pad connectors 210 are formed may be symmetrical with each other in the up and down direction and at the same time symmetrical with each other in the left and right direction with respect to the center of the surface of the brake pad 200. In addition, the brake pad connector 210 is a component that connects the brake pad 200 and the caliper body 100 with each other, and protrude outwardly of the surface of the brake pad 200 (see FIG. 11). Accordingly, the caliper body 100 includes a pad guide groove 110 that guides the movement of the brake pad connector 210 when the brake pad 200 moves in the front and rear direction.

Figure 6:
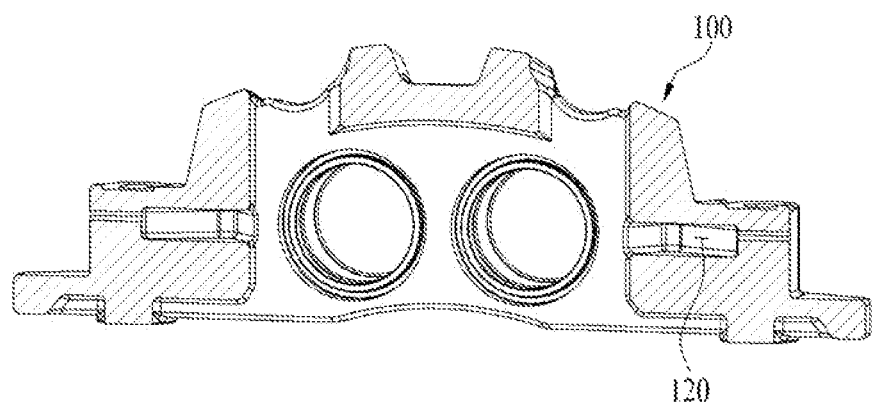
FIG. 6 is a cross-sectional view taken along a line B-B in FIG. 2.

FIG. 6 is a cross-sectional view taken along a line B-B in FIG. 2. A section B-B shows a cross-section of the brake caliper 1000 cut in an XY plane from above and rearward of the center. Accordingly, the brake pad 200 is not shown in FIG. 6. Referring to FIG. 6, a space with a circular edge is shown inside of the caliper body 100. The piston (or an actuator) may be positioned in such space so as to apply a force to the brake pad 200.

In addition, referring to FIG. 6, a spring seating groove 120 defined in the caliper body 100 is shown. The spring seating groove 120 is a space in which a spring 220 of the brake pad connector 210 is located. The spring seating groove 120 may be spatially connected with the pad guide groove 110 described above, and the brake pad 200 and the caliper body 100 may be connected to each other by inserting the spring 220 of the brake pad 200 into the spring seating groove 120. A more detailed structure will be described later (see FIG. 10).

Figure 7:
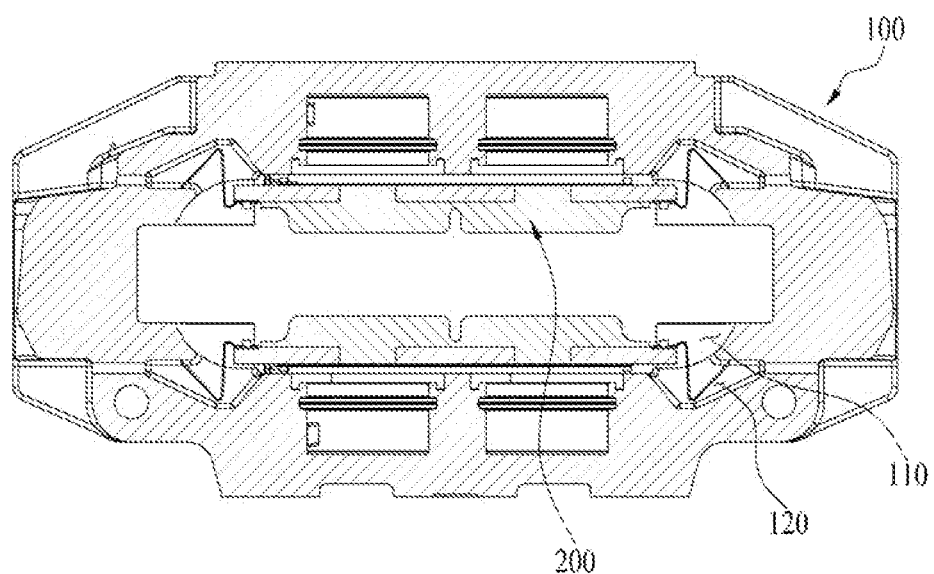
FIG. 7 is a cross-sectional view taken along a line A-A in FIG. 1.
Figure 8:
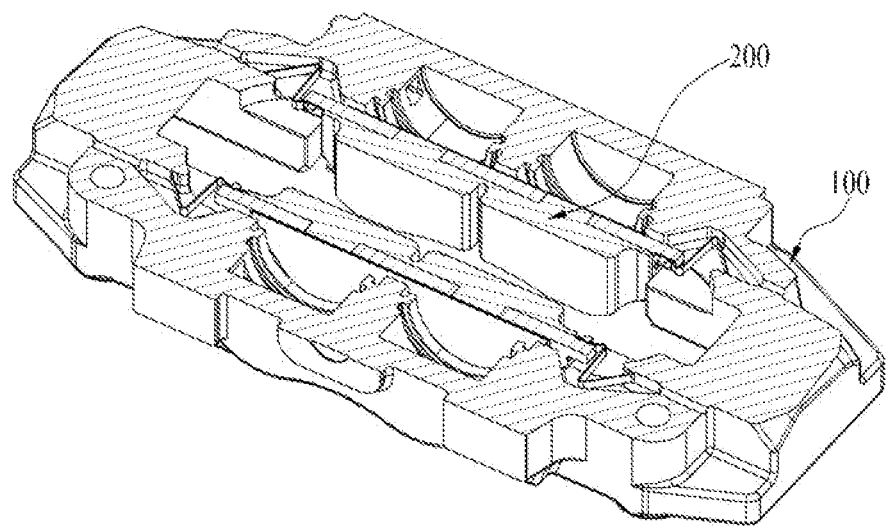
FIG. 8 is a view illustrating FIG. 7 viewed in a diagonal direction.

FIG. 7 is a cross-sectional view taken along a line A-A in FIG. 1. In addition, FIG. 8 is a view illustrating FIG. 7 viewed in a diagonal direction. FIG. 8 illustrates FIG. 7 viewed in a diagonal direction from above and right.

Referring to FIGS. 7 to 8, cross-sections of a portion where the caliper body 100 and the brake pad 200 are connected to each other are shown. As described above, the spaces of the pad guide groove 110 and the spring seating groove 120 are connected to each other, and the caliper body 100 and the brake pad 200 are connected to each other as the spring 220 of the brake pad connector 210 is fitted into the spring seating groove 120.

The spring 220 is formed in a shape suitable for being fitted into the spring seating groove 120. The brake disk (not shown) may be positioned between the two brake pads 200 shown in each of FIGS. 7 to 8, and the two brake pads 200 may be moved by the force of the piston (not shown) to come into contact with both surfaces of the brake disk (not shown) at the same time. When the wheel is not braked, each of the brake pads 200 may immediately return to the original position thereof by the elastic force of the spring 220.

Figure 9:
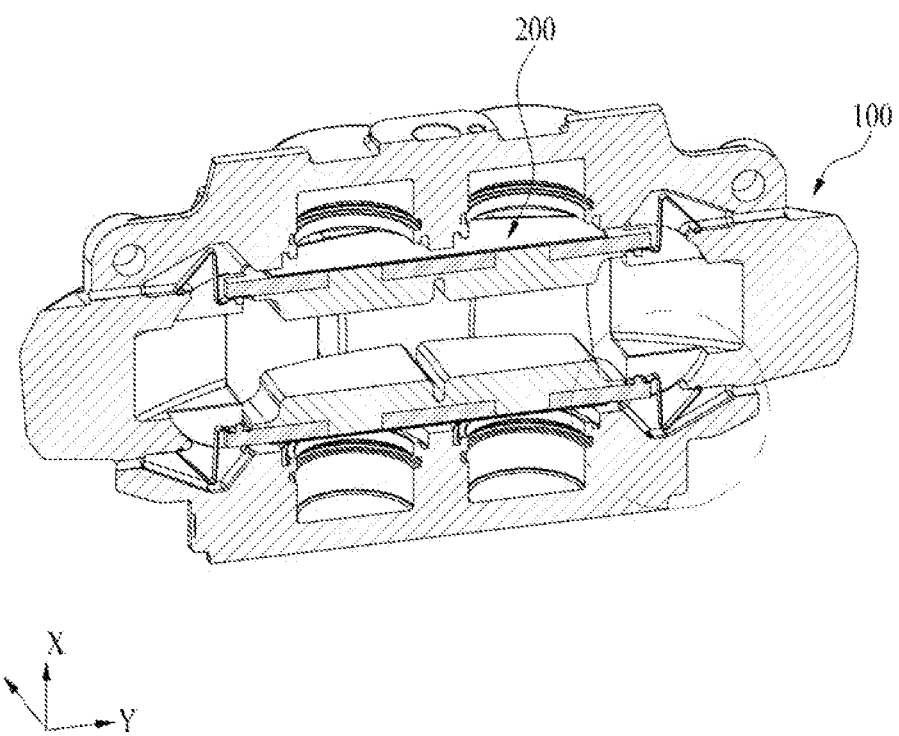
FIG. 9 is a cross-sectional view taken along a line D-D in FIG. 1.
Figure 10:
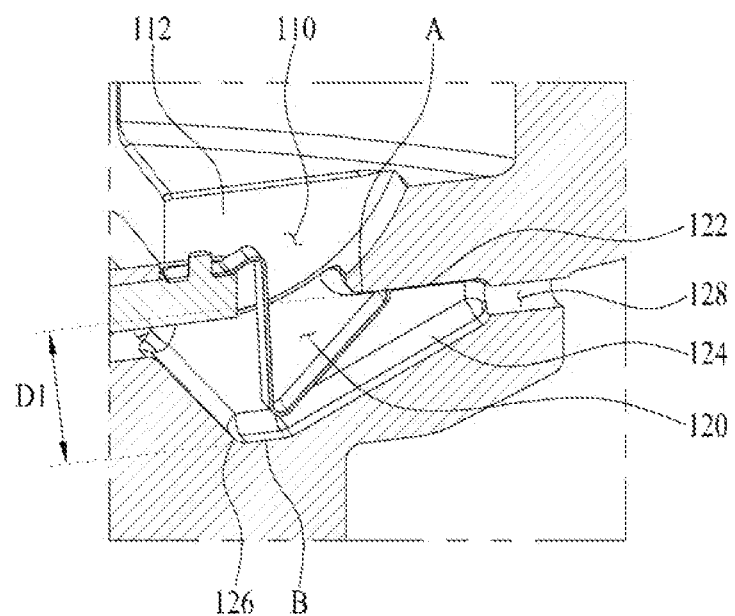
FIG. 10 is an enlarged view illustrating a connection portion between a brake pad and a caliper body according to one of embodiments of the present disclosure.

In one example, FIG. 9 is a cross-sectional view taken along a line D-D in FIG. 1, and FIG. 10 is an enlarged view illustrating a connection portion between the brake pad 200 and the caliper body 100 according to one of embodiments of the present disclosure. Referring to FIG. 10, the pad guide groove 110 and the spring seating groove 120 of the caliper body 100 are shown. Hereinafter, a configuration will be described with reference to the directions set in FIG. 1.

The pad guide groove 110 has a groove space into which the brake pad connector 210 of the brake pad 200 is inserted, and the groove space has a shape for allowing the brake pad connector 210 to slide along the groove space when the brake pad 200 moves. That is, a width in the up and down direction of the pad guide groove 110 may be equal to or slightly larger than a width in the up and down direction of the brake pad connector 210.

In addition, the pad guide groove 110 may have, as an edge, a guide surface 112 that comes into contact with the brake pad connector 210 (specifically, a protruding ear 212) so as to guide the brake pad connector 210 (specifically, the protruding ear 212). The pad guide surface 112 is formed to extend in the front and rear direction along a moving direction of the brake pad 200. The pad guide groove 110 may have a pair of pad guide surfaces 112 in contact with top and bottom surfaces of the protruding ear 212 as edges, and a surface that connects the pair of pad guide surfaces 112 to each other may be formed into a curved surface via R-cutting.

The spring seating groove 120 is defined as a groove space connected to the pad guide groove 110, and the groove space has a shape in which the spring 220 of the brake pad connector 210 may be inserted and seated. That is, a width in the up and down direction of the spring seating groove 120 may be equal to or slightly larger than a width in the up and down direction of the spring 220. More specifically, the spring seating groove 120 may have a first surface 122, a second surface 124, and a third surface 126 as edges. That is, a shape of the spring seating groove 120 may be determined by the first surface 122, the second surface 124, and the third surface 126 constituting the edges of the spring seating groove 120.

The first surface 122 is directed in the forward or rearward direction of the brake caliper 1000 (is parallel to the pad surface of the brake pad). In addition, the first surface 122 is extended in a direction in which the brake pad connector 210 protrudes starting from a point at which edges of the pad guide groove 110 and the spring seating groove 120 are connected to each other. That is, the first surface 122 may be a surface having a length by extending in the left and right direction of the brake caliper 1000. When the brake pad 200 moves in the front and rear direction, the first surface 122 may come into contact with a second extending member 225 (or a third bent portion 228) of the spring 220 so as to support the spring 220.

The second surface 124 is a surface extending in a diagonal direction starting from an extended end of the first surface 122. In this regard, the diagonal direction may be a diagonal line that advances in the front and rear direction and the left and right direction at the same vertical level in the brake caliper 1000.

A direction and an extended length of the third surface 126 may be determined such that the spring seating groove 120 may secure a space suitable for the movement of the spring 220 starting from an extended end of the second surface 124. The spring seating groove 120 is defined to have a depth allowing the spring 220 to be inserted. The depth of the spring seating groove 120 may be defined as a vertical distance from the first surface 122 of the spring seating groove 120. For example, in FIG. 10, the depth of the spring seating groove 120 may be a vertical distance from the first surface 122 to a point where the second surface 124 and the third surface 126 meet each other. The depth of the spring seating groove 120 is preferably equal to or greater than a length of the first extending member 223 of the spring 220. Therefore, even when an angle of the first extending member 223 is changed in a process of compressing the spring 220, the spring 220 may smoothly move inside the spring seating groove 120. Likewise, the depth of the spring seating groove 120 is preferably equal to or greater than a length of the second extending member 225 of the spring 220. Even when an angle of the second extending member 225 is changed in the process of compressing the spring 220, the spring 220 may move smoothly inside the spring seating groove 120.

In the spring 220, an angle between the first extending member 223 and the second extending member 225 is changed by an external force. The spring seating groove 120 has therein the groove space secured to accommodate the shape change of the spring 220.

The spring seating groove 120 may further include a maintenance hole 128. The maintenance hole 128 extends through the brake caliper 1000 in the same direction as an extending direction of the first surface 122 (a direction in which the spring may be compressed) from the point of the extended end of the first surface 122 (or the point where the first surface and the second surface meet each other). That is, the maintenance hole 128 may extend in the left and right direction of the brake caliper 1000 and may extend through the brake caliper 1000 from the spring seating groove 120.

The maintenance hole 128 may be used as a passage for inserting a stick for removing the brake pad 200 mounted in the brake caliper 1000, or may be used as a passage for discharging foreign substances introduced into the brake pad 200. For example, when the brake pad 200 is removed, the spring 220 may be pulled out from the spring seating groove 120 by inserting the stick into the maintenance hole 128 and compressing the spring 220 with the stick. In addition, when the brake caliper 1000 is mounted on the wheel of the vehicle, the maintenance hole 128 is oriented perpendicular to the ground, so that a fluid such as rainwater may be naturally discharged even when the fluid is introduced into the brake caliper 1000.

Figure 11:
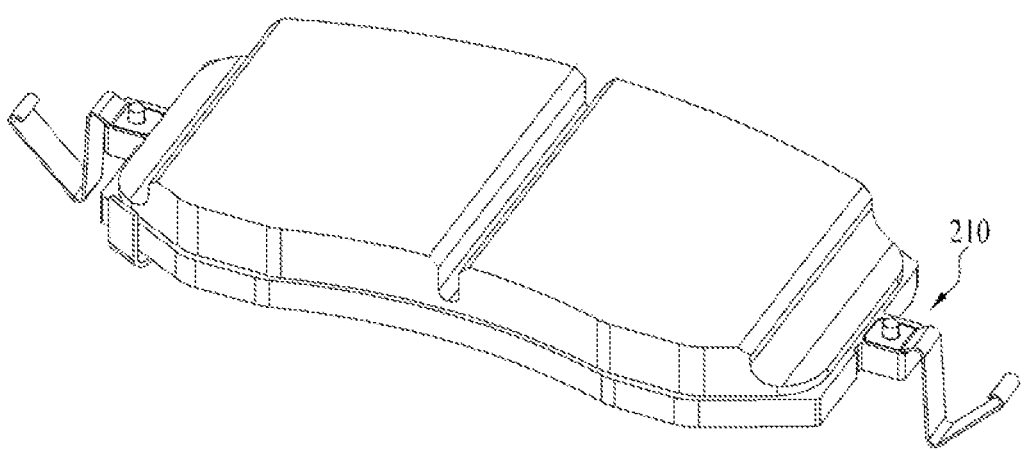
FIG. 11 is a perspective view of a brake pad according to one of embodiments of the present disclosure.
Figure 11:
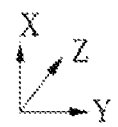
Figure 12:
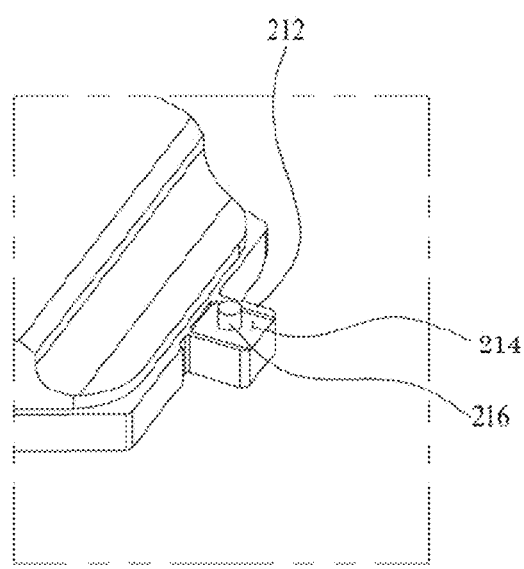
FIG. 12 is an enlarged view illustrating a connector of a brake pad according to one of embodiments of the present disclosure.
Figure 12:
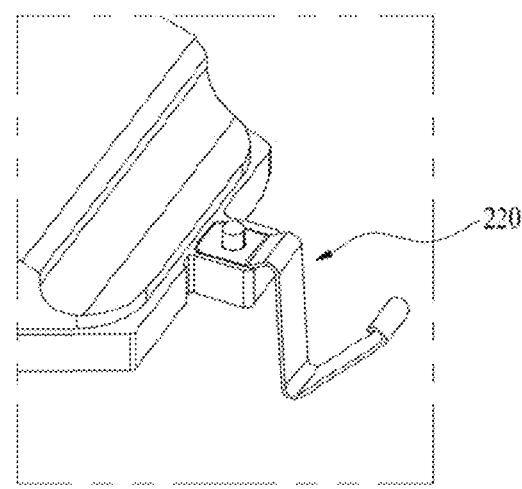
Figure 13:
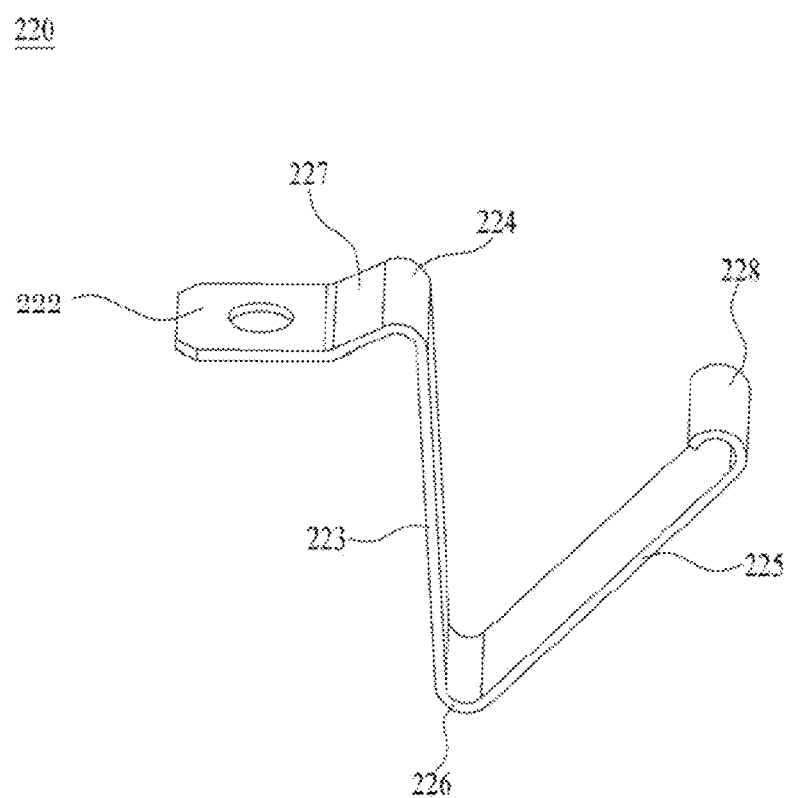
FIG. 13 illustrates a spring of a brake pad according to one of embodiments of the present disclosure.

FIG. 11 is a perspective view of the brake pad 200, and FIG. 12 is an enlarged view of the brake pad connector 210. In addition, FIG. 13 shows the spring 220 of the brake pad 200.

Referring to FIG. 11, the brake pad 200 includes the brake pad connectors 210 protruding outward from left and right edges, respectively. Based on the directions set in FIG. 1, the brake pad connectors 210 are positioned in the central portion in the up and down direction of the brake pad 200. Accordingly, the elastic force of the springs 220 transmitted via the brake pad connectors 210 may act on the brake pad 200 symmetrically in the up and down direction and the left and right direction, and the brake pad 200 may uniformly move in the front and rear direction without vertical or horizontal deviation.

Referring to FIG. 12, (a) in FIG. 12 shows the protruding ear 212 to which the spring 220 may be connected, and (b) in FIG. 12 shows the brake pad connector 210 to which the spring 220 is connected.

The protruding ear 212 may include an ear groove 214 and a fixing portion 216. The ear groove 214 is a groove adapted to a shape of a propping plate 222 of the spring 220 such that the spring 220 is fitted. That is, a width of the ear groove 214 may be equal to a width of the propping plate 222 of the spring 220 or is slightly greater than the width of the propping plate 222. As such, the ear groove 214 allows a portion of the spring 220 to be fitted therein so as to restrict a movement thereof, so that the spring 220 transmits the elastic force to the brake pad 200 completely, and a connected portion of the spring 220 is prevented from being loosened or moving.

The fixing portion 216 is a protrusion formed to protrude from an interior of the ear groove 214. The protrusion of the fixing portion 216 extends through a hole defined in the propping plate 222 to connect the spring 220 and the protruding ear 212 to each other. In addition, after the protrusion of the fixing portion 216 extends through the hole of the propping plate 222, the protrusion of the fixing portion 216 may not allow the spring 220 to be deviated from the protruding ear 212 via a punching operation. The fixing portion 216 may serve to fix the spring 220 so as not to be deviated from the protruding ear 212, and the spring 220 may be fixed with fixing means other than the protrusion inserted into the hole. That is, the fixing portion may use other fixing means that may be appropriately changed by a person having ordinary knowledge in the technical field to which the present disclosure belongs (hereinafter, referred to as "a person skilled in the art").

Referring to FIG. 13, each portion of the spring 220 is shown in detail. The spring 220 may include the propping plate 222, the first extending member 223, the second extending member 225, and the third extending member 227. In addition, the spring 220 may include a first bent portion 224, a second bent portion 226, and a third bent portion 228 at ends of the extending members.

The propping plate 222 has a shape that may be fitted into the ear groove 214 of the protruding ear 212 and has a hole that may be connected to the fixing portion 216. The third extending member 227 is connected to one side of the propping plate 222 while forming a predetermined angle with the propping plate 222. The first extending member 223 is connected to one side of the third extending member 227 while forming a predetermined angle with the third extending member 227. The second extending member 225 is connected to one side of the first extending member 223 while forming a predetermined angle with the first extending member 223.

The first bent portion 224 is a portion in which the first extending member 223 and the third extending member 227 are connected to each other with the predetermined angle, and the second bent portion 226 is a portion in which the first extending member 223 and the second extending member 225 are connected to each other with the predetermined angle. The third bent portion 228 is a portion formed by bending an end of the second extending member 225. A bent direction of the first bent portion 22 and a bent direction of the second bent portion 226 are opposite to each other. When the spring 220 is seated at the spring seating groove 120, the third bent portion 228 may be in contact with the first surface 122. Accordingly, the third bent portion 228 may be formed such that a portion in contact with the first surface 122 has a smooth curved shape.

The bent portion according to the present embodiment may be formed in a method of bending one member or a method of connecting a plurality of members to each other with a predetermined angle via welding or the like.

One end of the third extending member 227 is connected to the propping plate 222, and the other end of the third extending member 227 is connected to the first extending member 223. One end of the first extending member 223 is connected to the third extending member 227, and the other end of the first extending member 223 is connected to the second extending member 225. One end of the second extending member 225 is connected to the first extending member 223 and the other end of the second extending member 225 is bent to form the third bent portion 228.

In this regard, an angle formed between the first extending member 223 and the second extending member 225 in a normal state is in a range from about 0 degree to about 90 degrees, and the first extending member 223 is formed to be longer than the second extending member 225. In addition, an angle between the third extending member 227 and the propping plate 222 may be equal to or greater than about 90 degree. The angle formed between the first extending member 223 and the second extending member 225 may be changed based on the movement of the brake pad 200, and the change causes the elastic force to return the brake pad 200 to the original position thereof.

In one example, as another embodiment, the third extending member 227 may be omitted in the spring 220. That is, the first extending member 223 and the propping plate 222 may be directly connected to each other. However, when the third extending member 227 is disposed, flexibility of the movement of the spring 220 may be increased.

When the brake pad 200 is connected to the caliper body 100, a portion of the first extending member 223 and the second extending member 225 among the components of the spring 220 are located inside the spring seating groove 120, and the remaining portion of the first extending member 223, the third extending member 227, and the propping plate 222 are located inside the pad guide groove 110 (see FIG. 10).

The spring 220 generates the elastic force depending on the angle formed by the first extending member 223 and the second extending member 225. When the brake pad 200 applies braking to the brake disk, the angle formed between the first extending member 223 and the second extending member 225 increases, and a force to return the brake pad 200 to the original position thereof is applied by the elasticity.

FIGS. 14 to 28 illustrate a brake caliper according to an embodiment of the present disclosure that is different from the above-described embodiment.

Figure 14:
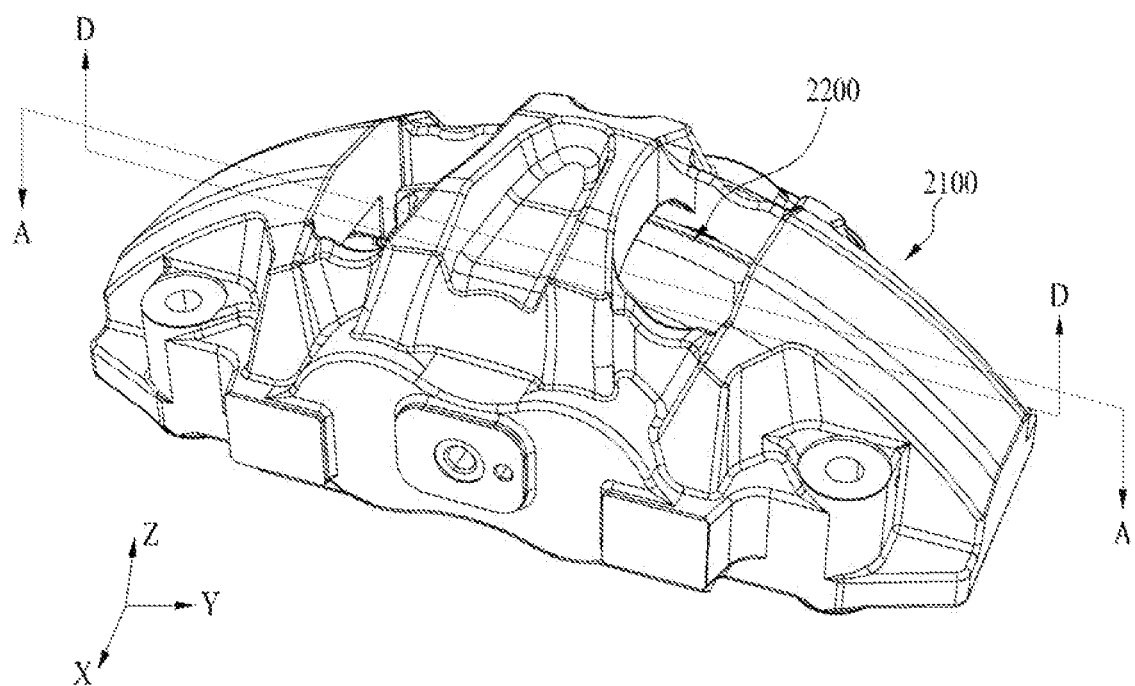
FIG. 14 is a perspective view of a 3D model of a brake caliper according to one of embodiments of the present disclosure.
Figure 15:
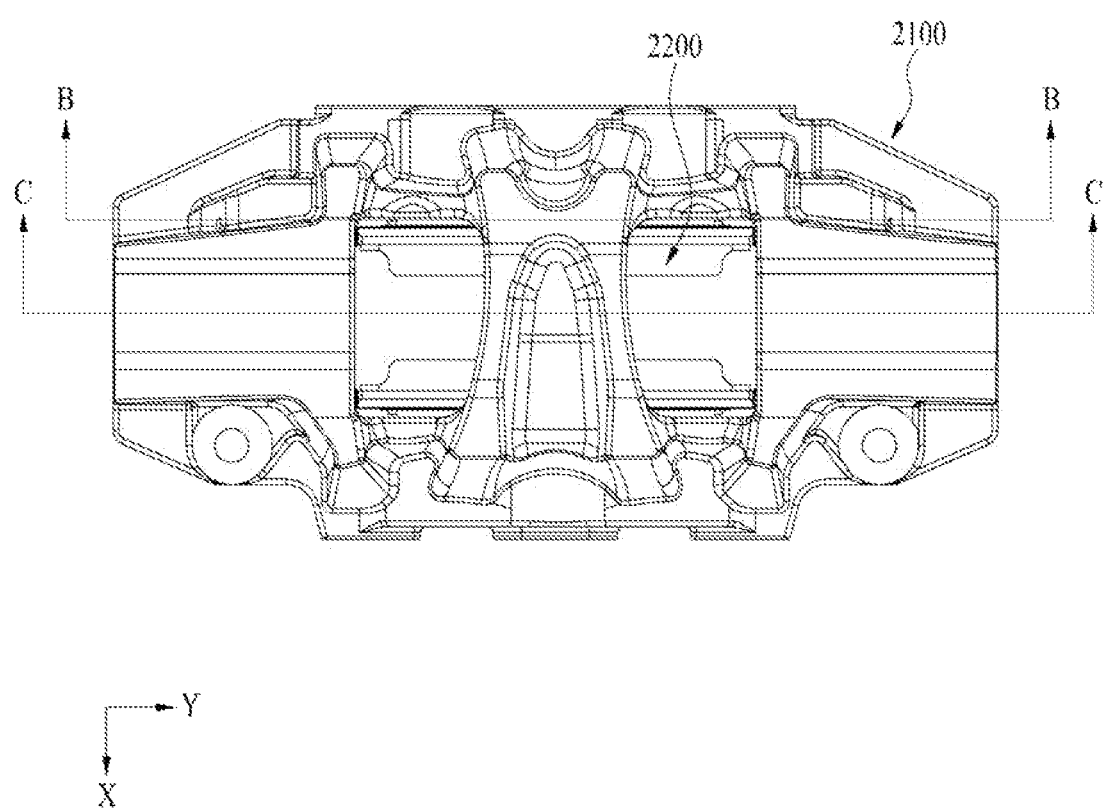
FIG. 15 is a top plan view of a 3D model of a brake caliper according to one of embodiments of the present disclosure.

FIG. 14 is a perspective view of a 3D model of a brake caliper (hereinafter, referred to as a "brake caliper") 2000 according to one of embodiments of the present disclosure. FIG. 15 is a top plan view of a 3D model of the brake caliper 2000 according to one of embodiments of the present disclosure, and FIG. 16 is a bottom plan view of a 3D model of the brake caliper 2000 according to one of embodiments of the present disclosure.

Figure 16:
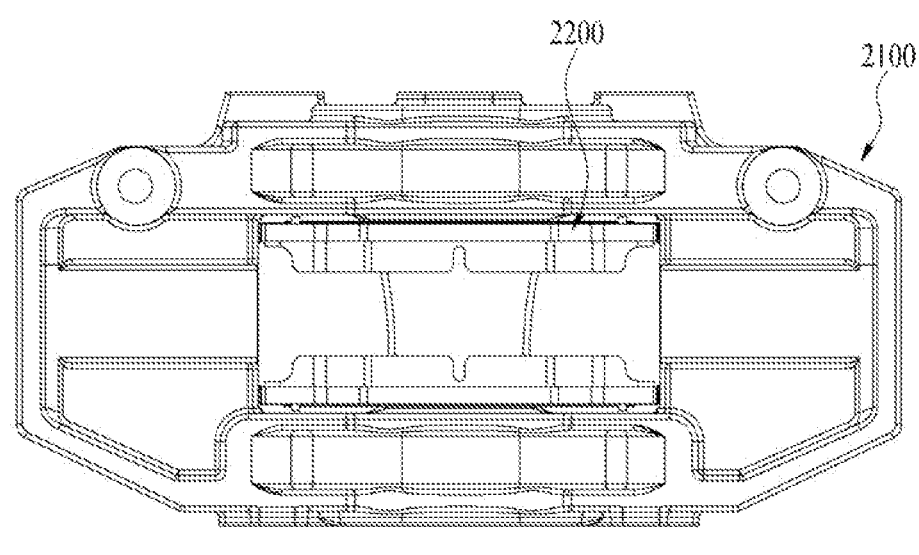
FIG. 16 is a bottom plan view of a 3D model of a brake caliper according to one of embodiments of the present disclosure.

As shown in FIGS. 14 to 16, the brake caliper 2000 includes a caliper body 2100 having a hollow defined therein and a brake pad 2200 seated at the hollow defined inside the caliper body 2100. The caliper body 2100 may be of a monoblock type in which all parts are integrated. In the monoblock type, an area of the brake pad 2200 is able to be designed widely, and the brake pads 2200 are able to compress a brake disk (not shown) connected to a vehicle wheel from both sides, so that a braking response is excellent.

Hereinafter, in describing components of the brake caliper 2000, an up and down direction, a left and right direction, and a front and rear direction are based on directions illustrated in FIG. 14. An upper side of the brake caliper 2000 shown in FIG. 14 is an upper side, a lower side thereof is a lower side, a left side thereof is a left side, and a right side thereof is a right side. In addition, a direction in which a surface of the brake caliper 2000 shown in FIG. 14 is directed is a forward direction, and a direction in which a surface of the brake caliper 2000 not shown in FIG. 14 is directed is a rearward direction. Similarly, with respect to coordinate axes shown in FIG. 14, a z-axis direction indicates the upward direction of the brake caliper 2000, a y-axis direction indicates a rightward direction of the brake caliper 2000, and an x-axis direction indicates the forward direction of the brake caliper 2000. FIGS. 14 to 16 show the brake caliper 2000 and a coordinate system of the x-axis, the y-axis, and the z-axis.

Figure 17:
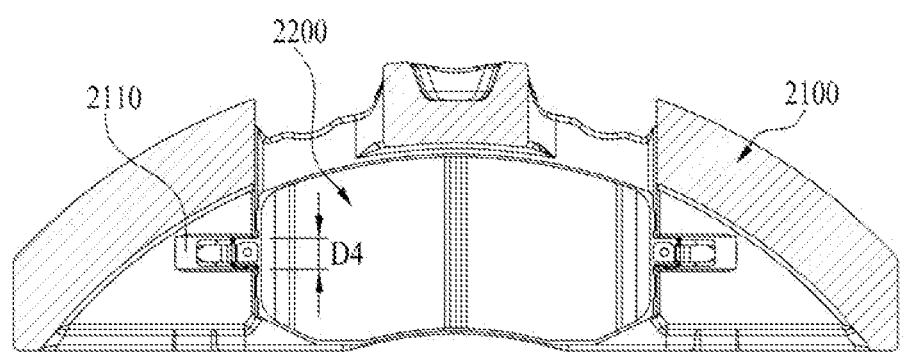
FIG. 17 is a cross-sectional view taken along a line C-C in FIG. 15.
Figure 17:
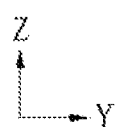
Figure 18:
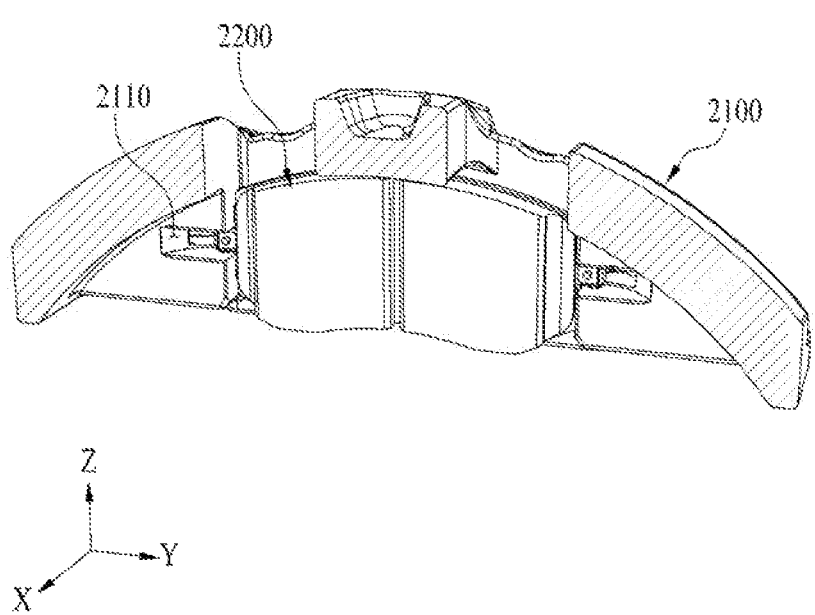
FIG. 18 is a view illustrating FIG. 17 viewed in a diagonal direction.

FIG. 17 is a cross-sectional view taken along a line C-C in FIG. 15. That is, FIG. 17 shows a cross-section of the brake caliper 2000 taken along a YZ plane from above and center. In addition, the cross-section shown in FIG. 17 represents a cross-section viewed in a direction indicated by a C-C cross-section indicating line in FIG. 15. FIG. 18 is a view illustrating FIG. 17 viewed in a diagonal direction from above and right. Referring to FIGS. 17 to 18, the state in which the brake pad 2200 is seated at the hollow inside of the caliper body 2100 is illustrated. The brake pad 2200 may move in the front and rear direction inside the caliper body 2100 so as to compress the brake disk (not shown).

The brake pad 200 in FIG. 17 may move in the front and rear direction inside the brake caliper 2000 by a piston (not shown). The brake pad 2200 may come into contact with the brake disk (not shown) by moving by an external force applied by the piston (not shown), and may apply a braking force to the wheel of a vehicle. Thereafter, when returning to an original position thereof, the brake pad 2200 moves (a return operation). In this regard, when the return operation of the brake pad 2200 is delayed or portions of a surface of the brake pad 2200 have a movement deviation, drag and braking noise may be caused.

The brake pad 2200 may include at least two brake pad connectors 2210 symmetrically at left and right sides thereof, and the brake pad connectors 2210 may be located in a central portion in the up and down direction of the brake pad 2200 based on the state shown in FIG. 17. Accordingly, the two brake pad connectors 2210 may be symmetrical with each other with respect to a center of the surface of the brake pad 2200. That is, the positions at which the brake pad connectors 2210 are formed may be symmetrical with each other in the up and down direction and at the same time symmetrical with each other in the left and right direction with respect to the center of the surface of the brake pad 200. In addition, the brake pad connector 2210 is a component that connects the brake pad 2200 and the caliper body 2100 with each other, and protrude outwardly of the surface of the brake pad 2200 (see FIG. 23). Accordingly, the caliper body 2100 includes a pad guide groove 2110 that guides the movement of the brake pad connector 2210 when the brake pad 2200 moves in the front and rear direction.

Figure 19:
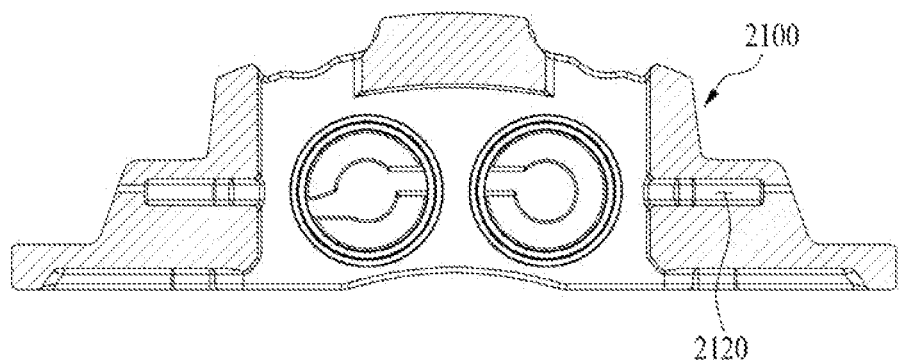
FIG. 19 is a cross-sectional view taken along a line B-B in FIG. 15.
Figure 19:
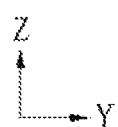

FIG. 19 is a cross-sectional view taken along a line B-B in FIG. 15. A section B-B shows a cross-section of the brake caliper 2000 cut in a YZ plane from rearward of the center. Accordingly, the brake pad 2200 is not shown in FIG. 19. Referring to FIG. 19, a space with a circular edge is shown inside of the caliper body 2100. The piston (or an actuator) (not shown) may be positioned in such space so as to apply a force to the brake pad 2200 and move the brake pad 2200.

In addition, referring to FIG. 19, a spring seating groove 2120 defined in the caliper body 2100 is shown. The spring seating groove 2120 is a space in which a spring 2220 of the brake pad connector 2210 is located. The spring seating groove 2120 may be spatially connected with the pad guide groove 2110 described above, and the brake pad 2200 and the caliper body 2100 may be connected to each other by inserting the spring 2220 of the brake pad 2200 into the spring seating groove 2120. A more detailed structure will be described later (see FIGS. 24 to 28).

Figure 20:
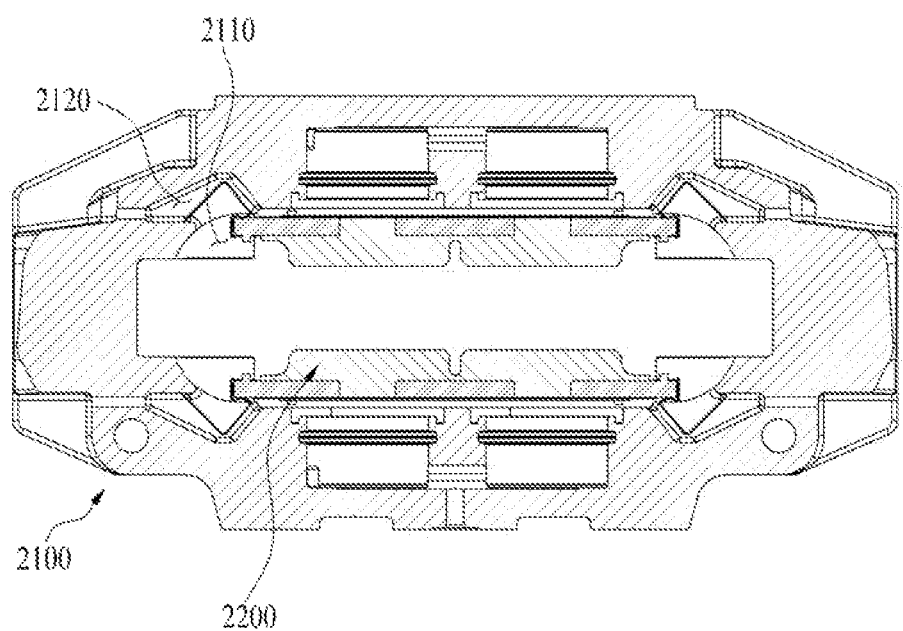
FIG. 20 is a cross-sectional view taken along a line A-A in FIG. 14.

FIG. 20 is a cross-sectional view taken along a line A-A in FIG. 14. In detail, FIG. 20 illustrates the brake caliper 2000 in FIG. 14 cut in the XY plane along the line A-A and viewed from below. Referring to FIG. 20, a cross-section of a portion where the caliper body 2100 and the brake pad 2200 are connected to each other is shown. As described above, the spaces of the pad guide groove 2110 and the spring seating groove 2120 are connected to each other, and the caliper body 2100 and the brake pad 2200 are connected to each other as the spring 2220 of the brake pad connector 2210 is fitted into the spring seating groove 2120.

The spring 2220 is formed in a shape suitable for being fitted into the spring seating groove 2120. The spring 2220 generates the elastic force while trying to restore an original state thereof even when two stick members connected to each other with a predetermined angle receive an external force and then the connection angle therebetween becomes narrow or the two stick members are away from each other.

The brake disk (not shown) may be positioned between the two brake pads 2200 shown in FIG. 20, and the two brake pads 2200 may be moved by the force of the piston (not shown) to come into contact with both surfaces of the brake disk (not shown) at the same time. When the wheel is not braked, each of the brake pads 2200 may immediately return to the original position thereof by the elastic force of the spring 2220.

Figure 21:
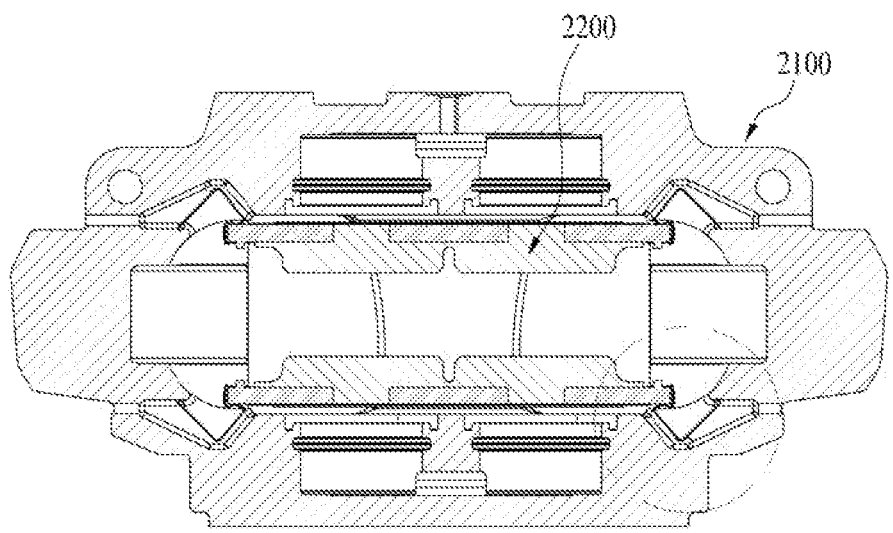
FIG. 21 is a cross-sectional view taken along a D-D in FIG. 14.
Figure 22:
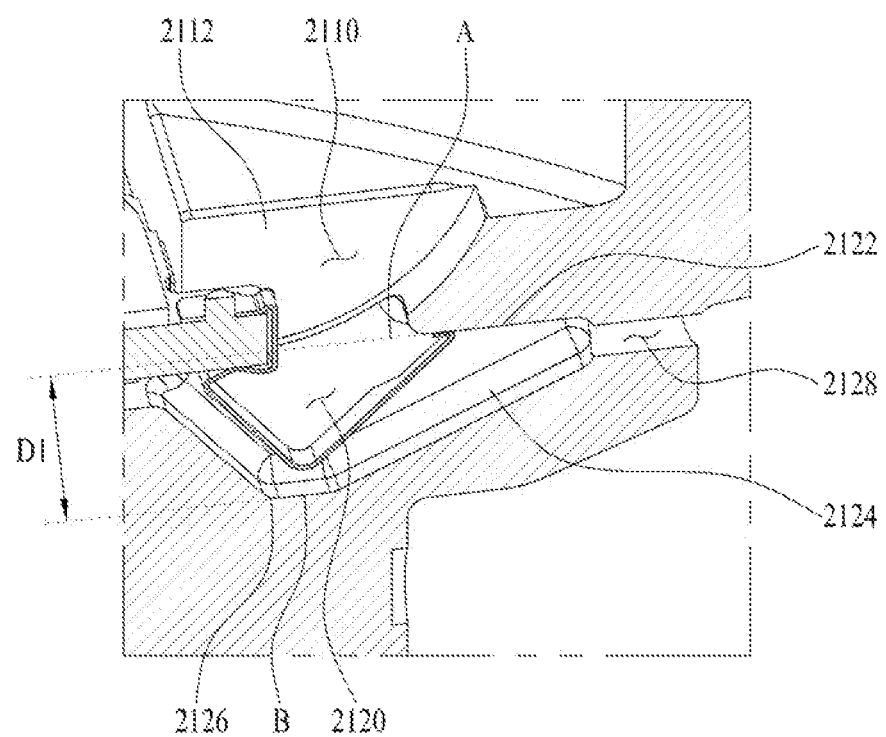
FIG. 22 is an enlarged view illustrating a connection portion between a brake pad and a caliper body in FIG. 21.

In one example, FIG. 21 is a cross-sectional view taken along a line D-D in FIG. 14, and FIG. 22 is an enlarged view illustrating a connection portion between the brake pad 2200 and the caliper body 2100. Referring to FIG. 22, the pad guide groove 2110 and the spring seating groove 2120 of the caliper body 2100 are shown. In FIG. 22, a cut cross-section of the brake pad 2200 is expressed as if an interior of the brake pad 2200 is an empty space, but this is irrespective of the technical idea to be described in the present embodiment. Hereinafter, configurations of the present embodiments will be described with reference to the directions set in FIG. 14.

The pad guide groove 2110 has a groove space into which the brake pad connector 2210 of the brake pad 2200 is inserted, and the groove space has a shape for allowing the brake pad connector 2210 to slide along the groove space in the front and rear direction when the brake pad 2200 moves. That is, a width, a thickness, or a depth of the pad guide groove 2110 may be determined such that the brake pad connector 2210 may be inserted into and may slide in the front and rear direction in the pad guide groove 2110.

In addition, the pad guide groove 2110 may have, as an edge, a pad guide surface 2112 that comes into contact with the brake pad connector 2210 so as to guide the brake pad connector 2210. The pad guide surface 2112 is formed to extend in the front and rear direction along a moving direction of the brake pad 2200. The pad guide groove 2110 may have a pair of pad guide surfaces 2112 in contact with top and bottom surfaces of the pad connector 2210 as edges, and a surface that connects the pair of pad guide surfaces 2112 to each other may be formed into a curved surface via R-cutting.

The spring seating groove 2120 is defined as a groove space connected to the pad guide groove 2110, and the groove space has a shape in which the spring 2220 of the brake pad connector 2210 may be inserted and seated. A width of the spring seating groove 2120 may be equal to or slightly larger than a width of the spring 2220, so that the spring 2220 does not move excessively in the up and down direction in the brake caliper 2000. In addition, the spring seating groove 2120 may have a first surface 2122, a second surface 2124, and a third surface 2126 as edges. That is, a shape of the spring seating groove 2120 may be determined by the first surface 2122, the second surface 2124, and the third surface 2126 constituting the edges of the spring seating groove 2120.

The first surface 2122 is directed in the forward or rearward direction of the brake caliper 2000 (or is parallel to the pad surface of the brake pad). In addition, the first surface 2122 may be extended in a direction in which the brake pad connector 2210 protrudes or in the left and right direction of the brake caliper 2000 starting from a point at which edges of the pad guide groove 2110 and the spring seating groove 2120 meet each other (a point A). That is, the first surface 2122 may have a length by extending in the left and right direction of the brake caliper 2000. When the brake pad 2200 moves in the front and rear direction, the first surface 2122 may come into contact with a second extending member 2228 (or a second bent portion 2228a) of the spring 2220 so as to support the spring 2220 and not allow the spring 2220 to be deviated from the spring seating groove 2120.

The second surface 2124 is a surface extending in a diagonal downward direction starting from an end of the first surface 122 extending from the point A. In this regard, the diagonal downward direction has been described based on the state shown in FIG. 22, but referring to FIG. 14, the diagonal direction extending from the second surface 2124 is a diagonal direction that advances in the front and rear direction and the left and right direction in the brake caliper 2000. An extended length and a diagonal angle of the second surface 2124 may be set so as not to interfere with the movement of the spring 2220 in the spring seating groove 2120 in consideration of contraction and extension of the spring 2220. A direction and an extended length of the third surface 2126 may be determined such that the spring seating groove 2120 may secure a space therein suitable for the movement of the spring 2220 starting from an extended end of the second surface 2124.

The spring seating groove 2120 is defined to have a depth allowing the spring 2220 to be inserted. The depth of the spring seating groove 2120 may be defined as a vertical distance from the first surface 2122 of the spring seating groove 2120. For example, in FIG. 22, the depth of the spring seating groove 2120 may be a vertical distance D1 from the first surface 2122 to a point B where the second surface 2124 and the third surface 2126 meet each other. The depth D1 of the spring seating groove 2120 is preferably equal to or greater than a length of the first extending member 2226 of the spring 2220. Therefore, even when an angle of the first extending member 2226 is changed in a process of compressing the spring 2220, the spring 2220 may smoothly move inside the spring seating groove 2120. Likewise, the depth of the spring seating groove 2120 is preferably equal to or greater than a length of the second extending member 2228 of the spring 2220. Even when an angle between the first extending member 2226 and the second extending member 2228 is changed in the process of compressing the spring 2220, the spring 2220 may move smoothly inside the spring seating groove 2120.

In the spring 2220, an angle between the first extending member 2226 and the second extending member 2228 is changed by an external force. The spring seating groove 2120 has therein the groove space secured to accommodate the shape change of the spring 2220.

The spring seating groove 2120 may further include a maintenance hole 2128. The maintenance hole 2128 extends through the brake caliper 2000 in the same direction as an extending direction of the first surface 2122 (a direction in which the spring may be compressed) from the point of the extended end of the first surface 2122 (or the point where the first surface and the second surface meet each other). That is, the maintenance hole 2128 may extend in the left and right direction of the brake caliper 2000 and may extend through the brake caliper 2000 from the spring seating groove 2120.

The maintenance hole 2128 may be used as a passage for inserting a stick for removing the brake pad 2200 mounted in the brake caliper 2000, or may be used as a passage for discharging foreign substances introduced into the brake pad 2200. For example, when the brake pad 2200 is removed, the spring 2220 may be pulled out from the spring seating groove 2120 by inserting the stick into the maintenance hole 2128 and compressing the spring 2220 with the stick. In addition, when the brake caliper 2000 is mounted on the wheel of the vehicle, the maintenance hole 2128 is oriented perpendicular to the ground, so that a fluid such as rainwater may be naturally discharged via the maintenance hole 2128 even when the fluid is introduced into the brake caliper 2000.

Figure 23:
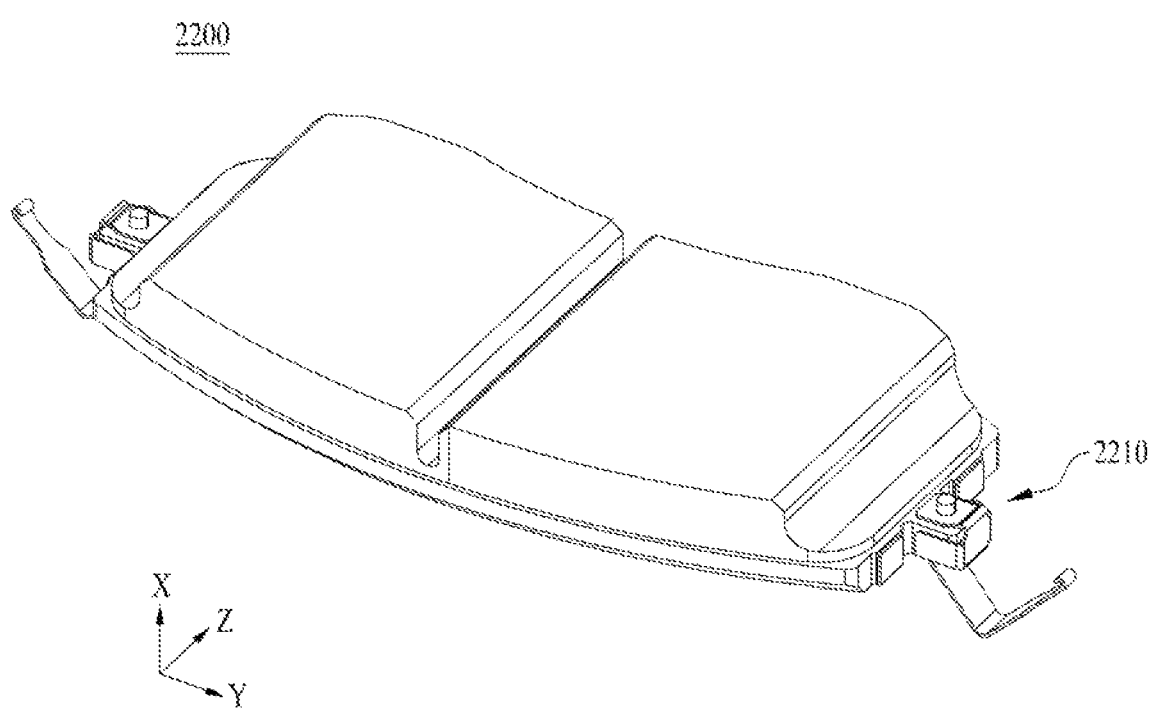
FIG. 23 is a perspective view of a brake pad according to one of embodiments of the present disclosure.
Figure 24:
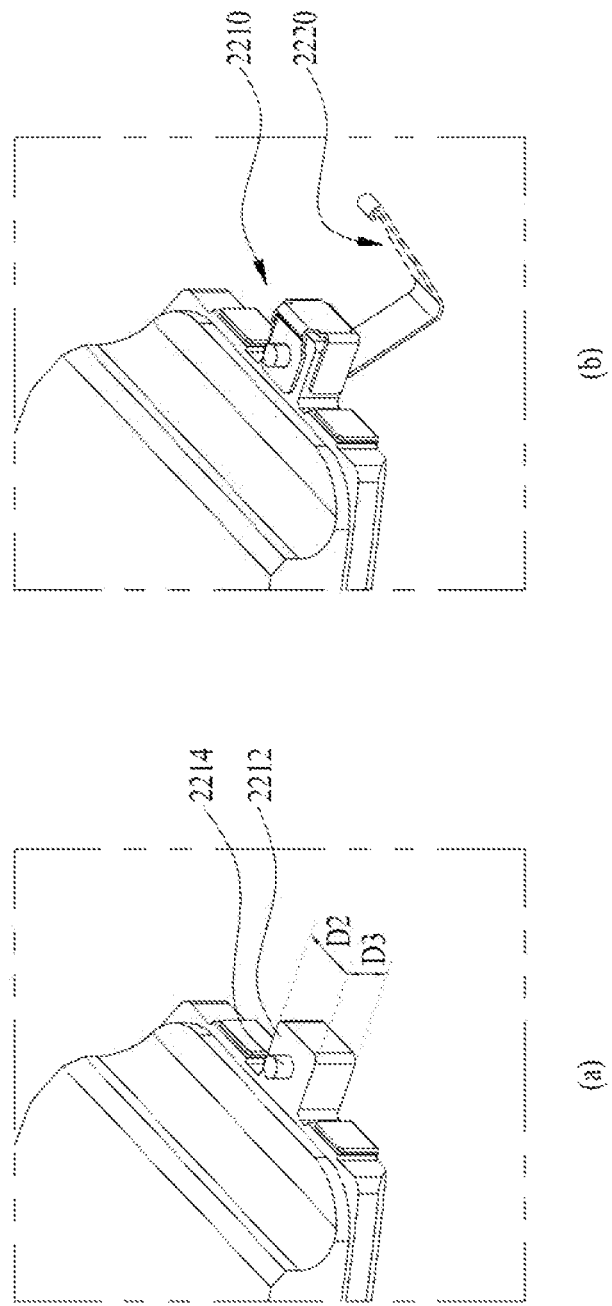
FIG. 24 is an enlarged view of a connector of a brake pad according to one of embodiments of the present disclosure.
Figure 25:
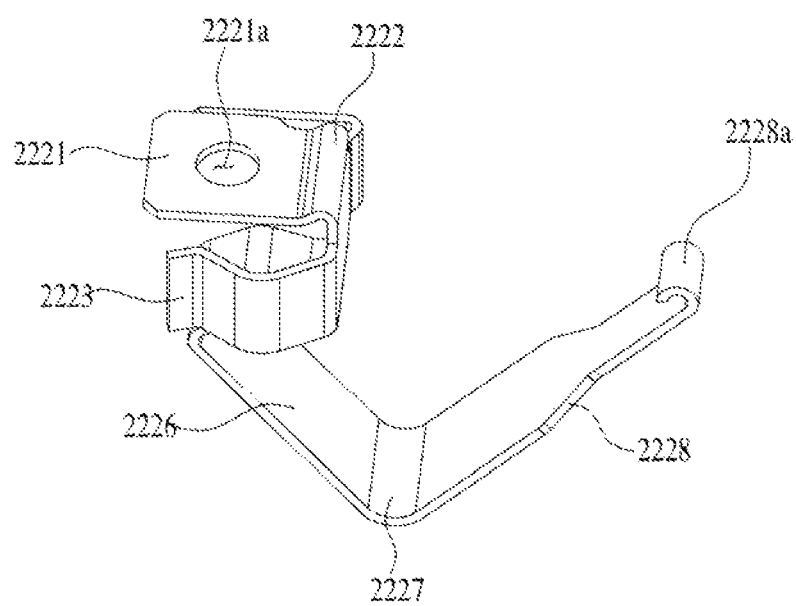
FIG. 25 is a front perspective view of a 3D model a spring of a brake pad according to one of embodiments of the present disclosure.

In one example, FIG. 23 is a perspective view of the brake pad 2200, and FIG. 24 is an enlarged view of the brake pad connector 2210. In addition, FIG. 25 shows the spring 2220 of the brake pad 2200.

Referring to FIG. 23, the brake pad 2200 includes the brake pad connectors 2210 protruding outward from left and right edges, respectively. Based on the directions set in FIG. 14, the brake pad connectors 2210 are positioned in the central portion in the up and down direction of the brake pad 2200. Accordingly, the elastic force of the springs 2220 transmitted via the brake pad connectors 2210 may act on the brake pad 2200 symmetrically in the up and down direction and the left and right direction, and the brake pad 2200 may uniformly move in the front and rear direction without vertical or horizontal deviation.

Referring to FIG. 24, figure (a) in FIG. 24 shows the protruding ear 2212 to which the spring 2220 may be connected, and figure (b) in FIG. 24 shows the brake pad connector 2210 to which the spring 2220 is connected. Hereinafter, descriptions of components will be described with reference to the directions in FIGS. 24 to 25.

The protruding ear 2212 may include an ear groove (not shown) and a fixing portion 2214. The ear groove is a groove defined in the protruding ear 2212 adapted to a shape of a fixing plate 2221 of the spring 2220 such that the spring 2220 is fitted.

A width of the ear groove may be equal to a width of the fixing plate 2221 of the spring 2220 or is slightly greater than the width of the fixing plate 2221. As such, the ear groove allows a portion of the spring 2220 (e.g., the fixing plate 2221) to be fitted therein so as to restrict a movement thereof, so that the spring 2220 transmits the elastic force to the brake pad 2200 completely, and a connected portion of the spring 2220 is prevented from being loosened or moving.

The fixing portion 2214 is a protrusion formed to protrude from a top surface of the protruding ear 2212. The fixing portion 2214 extends through a fixing hole 2221a defined in the fixing plate 2221 to connect the spring 2220 and the protruding ear 2212 to each other. In addition, the fixing portion 2214 may be deformed in shape by an external force while extending through the fixing hole 2221a, so that the fixing portion 2214 may not be able to be deviated from the fixing hole 2221a. That is, the spring 2220 may not be deviated from the protruding ear 2212. The fixing portion 2214 may serve to fix the spring 2220 so as not to be deviated from the protruding ear 2212, and fixing means other than the protrusion inserted into the hole may be applied. That is, the fixing portion may use other fixing means that may be appropriately changed by a person having ordinary knowledge in the technical field to which the present disclosure belongs (hereinafter, referred to as "a person skilled in the art").

Figure 26:
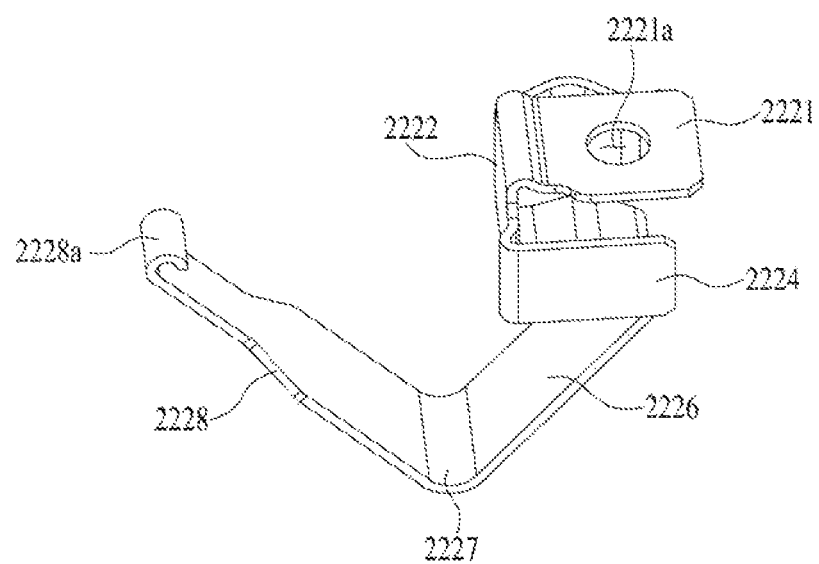
FIG. 26 is a rear perspective view of a 3D model of a spring of a brake pad according to one of embodiments of the present disclosure.
Figure 27:
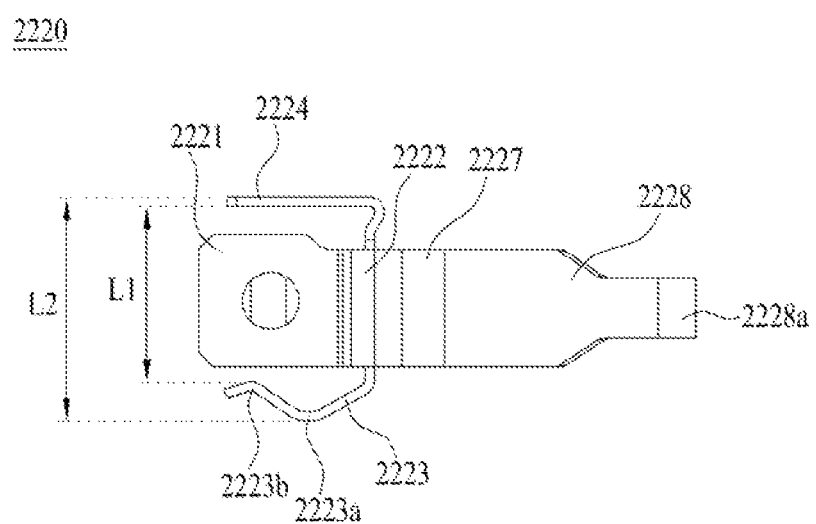
FIG. 27 is a top plan view of a 3D model of a spring of a brake pad according to one of embodiments of the present disclosure.
Figure 28:
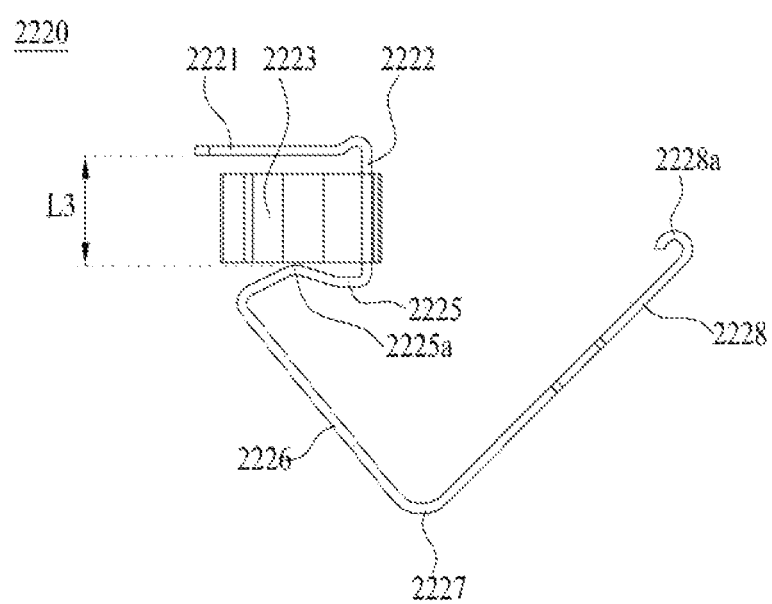
FIG. 28 is a front view of a 3D model of a spring of a brake pad according to one of embodiments of the present disclosure.

FIG. 25 shows a front perspective view of the spring 2220. FIG. 26 shows a rear perspective view of the spring 2220. In addition, FIG. 27 shows a top surface of the spring 2220, and FIG. 28 shows a front surface of the spring 2220.

Referring to FIGS. 25 to 28, the spring 2220 may include a fixing plate 2221, a support plate 2222, a first slide plate 2223, a second slide plate 2224, a propping plate 2225, a first extending member 2226, and a second extending member 2228. In addition, the spring 2220 may include a first bent portion 2227 and a second bent portion 2228a at ends of the extending members. In a following description, a direction for illustrating a connection relationship between components of the protruding ear 2212 and the spring 2220 is set with reference to FIGS. 24 to 25. A portion mainly shown in FIGS. 24 to 25 is a front portion of the spring 2220, and an opposite side thereof is a rear portion of the spring 2220.

The fixing plate 2221 is a flat plate in contact with the top surface of the protruding ear 2212, and has a fixing hole 2221a define therein through which the fixing portion 2214 may extend.

The support plate 2222 is a plate that is connected to one edge of the fixing plate 2221 and extends in a vertical downward direction. As shown in figure (b) in FIG. 24, the support plate 2222 may come into contact with ae first side surface of the protruding ear 2212 so as to surround the protruding ear 2212.

The first slide plate 2223 and the second slide plate 2224 extend in a direction surrounding the protruding ear 2212 from both side edges of the support plate 2222, respectively. The first slide plate 2223 is in contact with a second side surface (a front surface) of the protruding ear 2212 and surrounds the protruding ear 2212, and the second slide plate 2224 is in contact with a third side surface (a rear surface) of the protruding ear 2212 and surrounds the protruding ear 2212. The first slide plate 2223 and the second slide plate 2224 are plates positioned on opposite sides with respect to the protruding ear 2212, and a distance L1 between the first slide plate 2223 and the second slide plate 2224 may be equal to or smaller than a first width D2 (see FIG. 24) of the protruding ear 2212. In this regard, the first width D2 is defined as a distance between the second side surface (the front surface) and the third side (the rear surface) of the protruding ear 2212.

The first slide plate 2223 may further include bent portions 2223a and 2223b bent along a line in the upward direction as shown in FIG. 27. Because a distance between the first slide plate 2223 and the second slide plate 2224 varies at points on the plate because of the bent portions 2223a and 2223b, L1 is defined as a minimum distance between the first slide plate 2223 and the second slide plate 2224. The minimum distance L1 between the first slide plate 2223 and the second slide plate 2224 may be smaller than a first width D2 of the protruding ear 2212. Therefore, the protruding ear 2212 may be fastened between the first slide plate 2223 and the second slide plate 2224 in a fitted manner.

In addition, referring to FIG. 27, a maximum distance L2 may be defined based on outer surfaces of the first slide plate 2223 and the second slide plate 2224. A maximum distance L2 between the first slide plate 2223 and the second slide plate 2224 may be smaller than or equal to a width D4 (see FIG. 17) of the pad guide groove 2110. That is, the first slide plate 2223 has one or more bent portions 2223a and 2223b.

The minimum distance L1 between the first slide plate 2223 and the second slide plate 2224 may be smaller than the first width D2 (see FIG. 24) of the protruding ear 2212, and the maximum distance L2 between the first slide plate 2223 and the second slide plate 2224 may be equal to or smaller than the width D4 of the pad guide groove 2110.

The first slide plate 2223 and the second slide plate 2224 not only surround and support the protruding ear 2212, but also compress the protruding ear 2212 appropriately to increase integration of the protruding ear 2212 and the spring 2220. Accordingly, the movement of the brake pad 2200 is stabilized, braking performance is improved, and noise and drag are reduced.

The propping plate 2225 is connected to a lower edge of the support plate 2222 and extends to surround the protruding ear 2212 in contact with a bottom surface of the protruding ear 2212. In addition, the propping plate 2225 may have a bent portion 2225a, and a minimum distance L3 between the fixing plate 2221 and the propping plate 2225 may be smaller than the second width D3 (see FIG. 24) of the protruding ear 2212. In this regard, the second width D3 of the protruding ear 2212 represents a distance between the top surface and the bottom surface of the protruding ear 2212. Accordingly, the fixing plate 2221 and the propping plate 2225 may compress the protruding ear 2212 located therebetween, and the braking performance of the brake may be improved as integrity of the spring 2220 and the brake pad 2200 is increased.

The first extending member 2226 is connected to one edge of the propping plate 2225 while forming a predetermined angle with the propping plate 2225. The second extending member 2228 is connected to one end of the first extending member 2226 while forming a predetermined angle with the first extending member 2226. The spring 2220 generates an elastic force as the angle formed by the first extending member 2226 and the second extending member 2228 is changed by an external force (e.g., an external force that induces the movement of the brake pad).

The first bent portion 2227 is a portion in which the first extending member 2226 and the second extending member 2228 are connected to each other with a predetermined angle. The second bent portion 2228a is a portion in which an end of the second extending member 2228 is bent. When the spring 2220 is seated at the spring seating groove 2120 and the brake pad 2200 moves, the second bent portion 2228a may come into contact with and rub against the first surface 122. Accordingly, the second bent portion 2228a may be formed such that a portion in contact with the first surface 2122 has a curved shape.

The bent portion according to the embodiments disclosed herein may be formed in a method of bending one member or formed in a method of connecting a plurality of members to each other by welding or the like.

One end of the first extending member 2226 is connected to the propping plate 2225, and the other end of the first extending member 2226 is connected to the second extending member 2228. One end of the second extending member 2228 is connected to the first extending member 2226 and the other end of the second extending member 2228 is bent so as to form the second bent portion 2228a.

An angle formed between the first extending member 2226 and the second extending member 2228 in a normal state may be in a range from about 0 degree to about 90 degrees. In addition, the first extending member 2226 may be formed to be longer than the second extending member 2228. The angle formed between the first extending member 2226 and the second extending member 2228 may be changed based on the movement of the brake pad 2200, and the change causes the elastic force to return the brake pad 2200 to the original position thereof.

When the brake pad 2200 is connected to the caliper body 2100, an entirety or a portion of the first extending member 2226 among the components of the spring 2220 is located inside the spring seating groove 2120, and the fixing plate 2221, the support plate 2222, the first slide plate 2223, the second slide plate 2224, and the propping plate 2225 are located inside the pad guide groove 2110 (see FIG. 22).

The spring 220 generates the elastic force depending on the angle formed by the first extending member 2226 and the second extending member 2228. When the brake pad 2200 applies braking to the brake disk, the angle formed between the first extending member 2226 and the second extending member 2228 increases, and a force to return the brake pad 2200 to the original position thereof is applied by the elasticity.

The components of the brake calipers 1000 and 2000 according to the embodiments of the present disclosure may be combined with each other between the embodiments to create new embodiments. For example, when some components in a first embodiment and a second embodiment are combined with each other, a third embodiment may be created.

A brake pad, a brake caliper equipped with the brake pad, or a vehicle equipped with the brake caliper according to embodiments of the present disclosure effectively reduce a drag phenomenon and braking noise during a braking operation of the vehicle. An entirety of the brake pad may move uniformly by applying a return force symmetrically to both side surfaces of the brake pad. In addition, unlike the prior art, because return structures are located at both side surfaces of the brake pad, a free space may be secured at an upper portion of the caliper body, and the brake caliper may be efficiently designed by utilizing the free space. In addition, the brake pad may be easily attached and detached by the structure of the caliper body, and foreign substances introduced into the caliper body may be easily discharged. In addition, because integrity of the brake pad and the spring is increased, a movement of the brake pad may be stable, a possibility of deviation of a spring may be minimized, and a braking performance may be improved by efficiently transmitting a return force of the spring to the brake pad.

The detailed descriptions of the preferred embodiments of the present disclosure disclosed as described above have been provided to enable those skilled in the art to implement and practice the present disclosure. Although described above with reference to the preferred embodiments of the present disclosure, those skilled in the art will be able to understand that the present disclosure may be variously modified and changed without departing from the scope of the present disclosure. For example, those skilled in the art may use the components described in the above-described embodiments in a manner of combining the components with each other.

Accordingly, the present disclosure is not intended to be limited to the embodiments described herein, but is to be accorded the widest scope consistent with the principles and novel features disclosed herein.

What is claimed is:

1. A brake pad seated at a caliper body, comprising a brake pad surface and at least two brake pad connectors connected to the caliper body and symmetrically positioned with respect to a center of the brake pad surface, wherein each brake pad connector includes:
a protruding ear protruding from the brake pad outwardly from the brake pad surface; and
a spring connected to the protruding ear,
wherein the protruding ear includes:
an ear groove at which a portion of the spring is seated; and
a fixing portion configured to fix the spring to the protruding ear, and
wherein the spring includes:
a propping plate seated at the ear groove and connected to the fixing portion;
a first extending member connected to the propping plate at a first angle with respect to the propping plate; and
a second extending member connected to the first extending member at a second angle with respect to the first extending member.

2. The brake pad of claim 1, wherein the protruding ear has a fixing portion configured to connect to the spring.

3. The brake pad of claim 2, wherein the spring includes:
a fixing plate coupled to the fixing portion and in contact with a top surface of the protruding ear;
a support plate connected to an edge of the fixing plate and in contact with a side surface of the protruding ear;
a propping plate connected to an edge of the support plate and in contact with a bottom surface of the protruding ear;
a first extending member having a first end connected to the edge of the propping plate; and
a second extending member having an end connected to a second end of the first extending member at a predetermined angle with respect to the first extending member.

4. The brake pad of claim 3, wherein the spring further includes:
a first slide plate connected to an edge of a first side surface of the support plate and in contact with a first side surface of the protruding ear; and
a second slide plate connected to an edge of a second side surface of the support plate and in contact with a second side surface of the protruding ear.

5. The brake pad of claim 4, wherein:
the first slide plate includes at least one bent portion, and
a minimum distance between the first slide plate and the second slide plate is smaller than a first width of the protruding ear,
wherein a minimum distance between the fixing plate and the propping plate is smaller than a second width of the protruding ear,
wherein the propping plate includes at least one bent portion.

6. A brake caliper equipped with the brake pad of claim 4, the brake caliper comprising:
the brake pad; and
the caliper body having an internal space at which the brake pad is seated.

7. The brake caliper of claim 6, wherein the caliper body includes:
a pad guide groove configured to guide the brake pad connector of the brake pad when the brake pad moves; and
a spring seating groove at which the spring of the brake pad is seated,
wherein the pad guide groove has a pad guide surface in contact with an outer surface of the first slide plate or an outer surface of the second slide plate, wherein the spring seating groove has a depth greater than a length of the first extending member of the spring.

8. The brake caliper of claim 7, wherein the caliper body has a maintenance hole connected to an external space through the caliper body from the spring seating groove,
wherein the spring seating groove has a first surface parallel to the brake pad and configured to support the second extending member when the spring is tensioned,
wherein the maintenance hole extends in a direction to compress the spring, and
wherein the pad guide groove and the spring seating groove are joined to each other.

9. The brake pad of claim 3, wherein the fixing portion includes a protrusion and has a fixing hole through which the protrusion extends.

10. A brake caliper including the brake pad of claim 1, the brake caliper comprising:
the brake pad; and
the caliper body having an internal space at which the brake pad is seated.

11. The brake caliper of claim 10, wherein the caliper body includes:
a pad guide groove configured to guide the protruding ear of the brake pad when the brake pad moves; and
a spring seating groove at which the spring of the brake pad is seated.

12. The brake caliper of claim 11, wherein the spring seating groove has a maintenance hole through which the spring seating groove and an external space are joined.

13. The brake caliper of claim 12, wherein:
the spring seating groove has a surface disposed parallel to a pad surface of the brake pad, and
the spring seating groove has a first surface configured to support the second extending member of the spring when the brake pad moves,
wherein the pad guide groove and the spring seating groove are joined to each other,
wherein the maintenance hole is parallel to a longitudinal direction of the first surface, and disposed in a direction to compress the spring.

14. The brake caliper of claim 11, wherein the pad guide groove has a pad guide surface in contact with an outer surface of the protruding ear,
wherein the spring seating groove has a depth greater than a length of the first extending member of the spring.

15. The brake pad of claim 1, wherein:
the fixing portion includes a protrusion protruding in the ear groove, and
the propping plate has a hole through which the protrusion extends,
wherein the second angle between the first extending member and the second extending member is between about 0 degree and about 90 degrees, and
wherein the first extending member is longer than the second extending member.

16. The brake pad of claim 15, wherein:
the spring further includes a third extending member positioned between and connected to the propping plate and the first extending member, and
an angle between the third extending member and the propping plate is equal to or greater than about 90 degrees.

* * * * *